Nov. 23, 1943.  G. H. HUFFERD  2,334,875
MULTIPLE DETACHABLE COUPLING
Filed Sept. 29, 1941  3 Sheets-Sheet 3
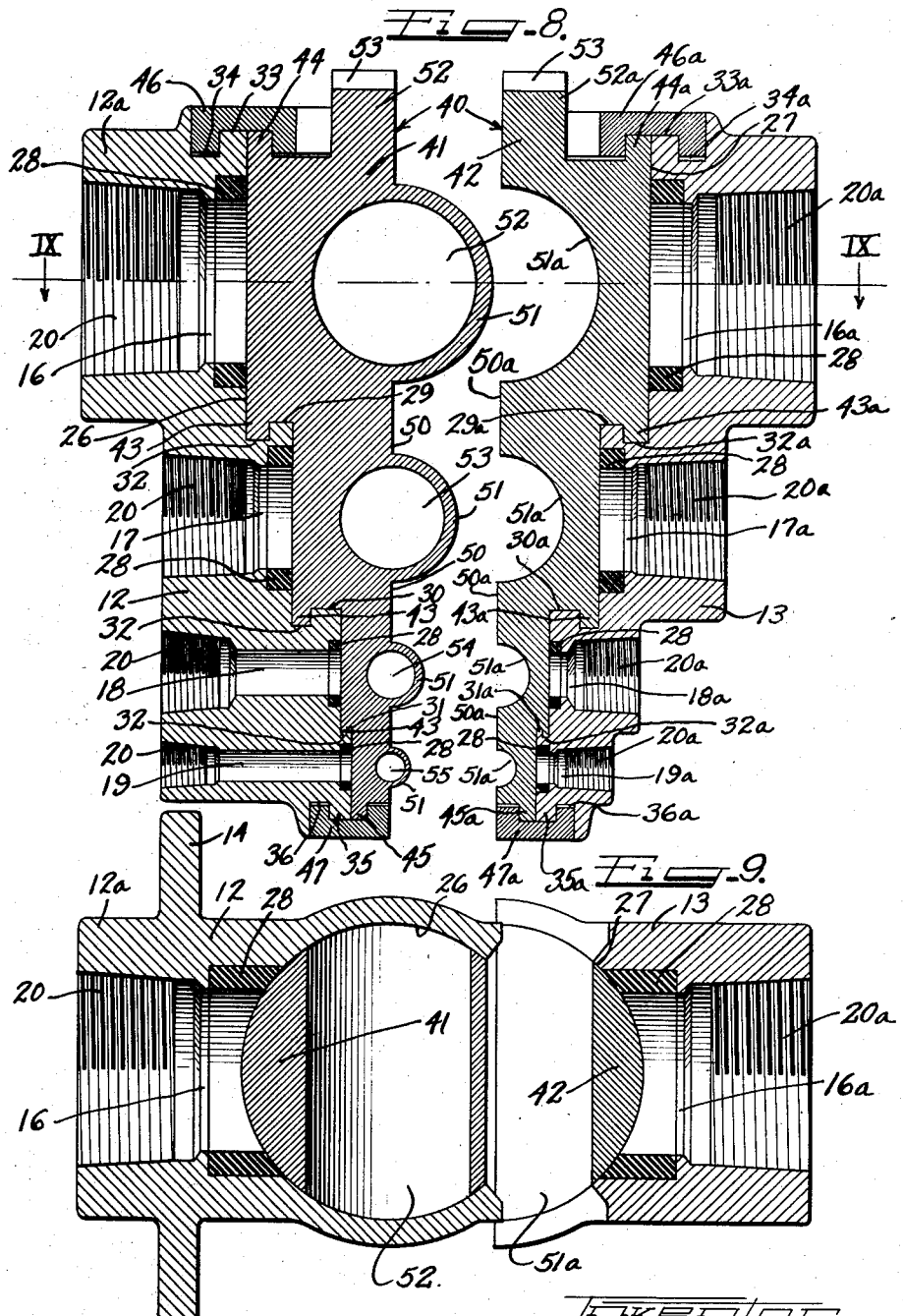
Inventor
GEORGE H. HUFFERD.

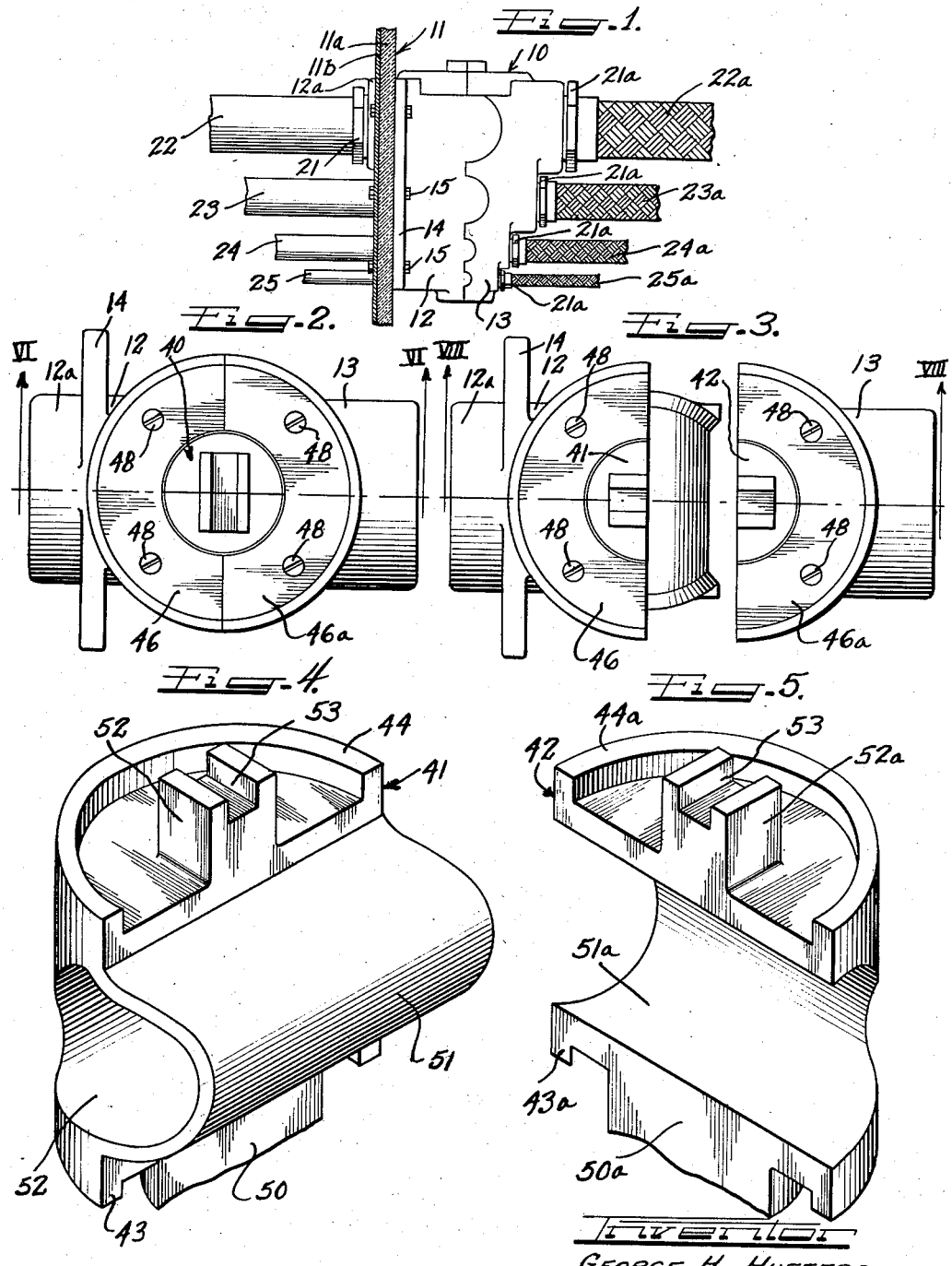

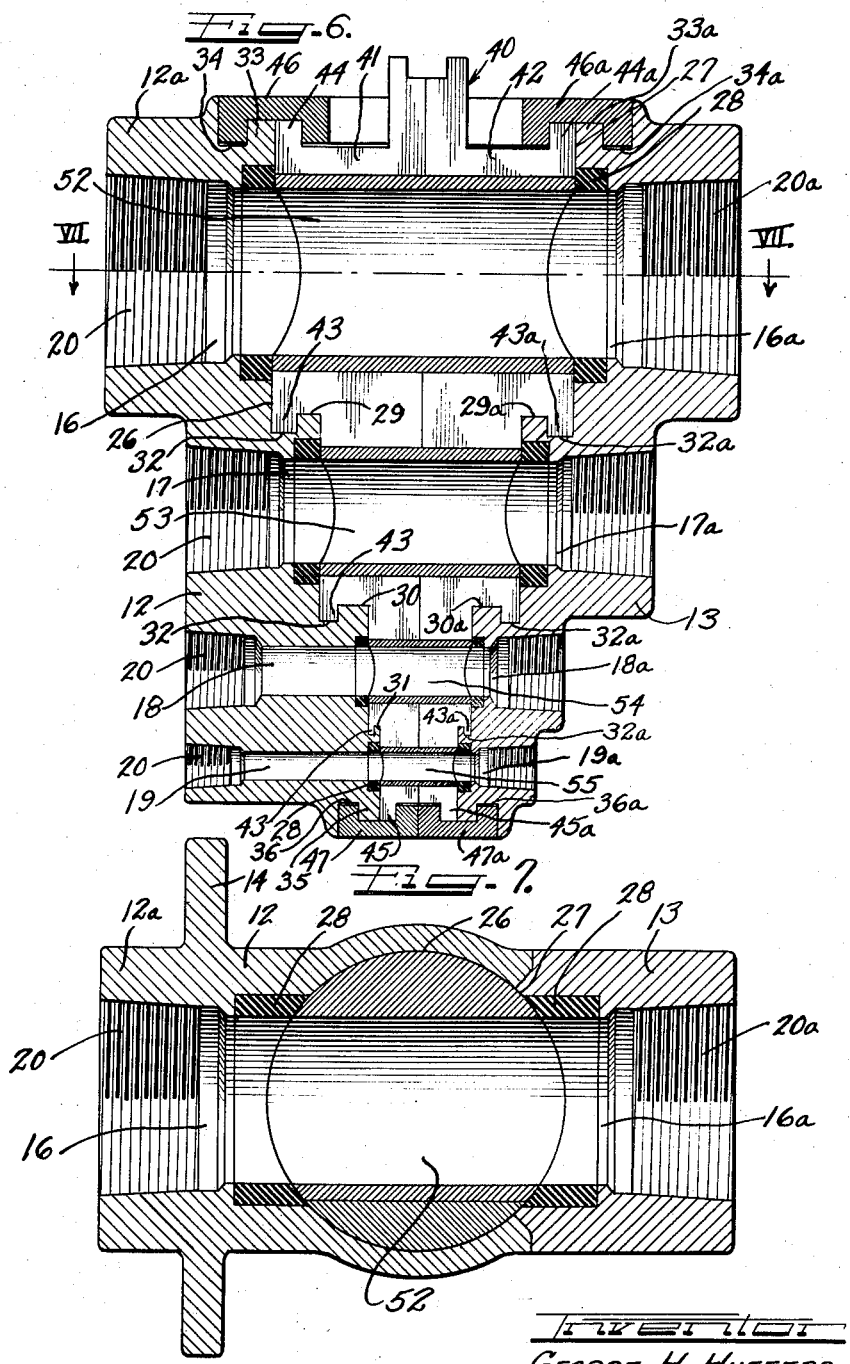

Patented Nov. 23, 1943

2,334,875

UNITED STATES PATENT OFFICE 2,334,875

MULTIPLE DETACHABLE COUPLING

George H. Hufferd, Grosse Pointe, Mich., assignor to Thompson Products Incorporated, Cleveland, Ohio, a corporation of Ohio Application September 29, 1941, Serial No. 412,843

6 Claims. (Cl. 284—4)

This invention relates to couplings having a plurality of passages adapted to be automatically sealed whenever the coupling parts are disconnected.

More specifically the invention relates to a coupling device having a pair of coupling boxes each providing a plurality of ports for individual connection with tubes, pipes and the like and a single split plug type valve for sealing the ports whenever the coupling boxes are disconnected and for detachably connecting the boxes together while placing the ports of one box in communication with the respective ports of the other box whereby coupling and uncoupling of the boxes is performed by a simple quarter turn of the plug type valve.

This application is a continuation in part of my copending application entitled "Self-sealing detachable coupling," Serial No. 386,074 filed March 31, 1941.

In the copending application Serial No. 386,074 there is disclosed and claimed a self sealing detachable coupling composed of two coupling boxes and a split rotatable cylindrical valve to detachably connect the coupling boxes for placing the ends of two tubes or pipes in fluid flow communication. In accordance with the present invention the ends of a plurality of pairs of tubes or pipes are adapted to be connected through a single coupling structure including a pair of coupling boxes each having a plurality of passageways therethrough and a split rotatable cylindrical valve for detachably connecting the boxes and for defining an intermediate conduit between each pair of passageways.

The invention is especially adapted for use in connection with fuel and oil lines to airplane engines and will hereinafter be specifically described for such use, but it should be understood that the couplings of the invention are not limited to any particular use.

Each coupling box has a semi-cylindrical recess or a plurality of semi-cylindrical recesses of progressively increasing size receiving a rotatable split plug. The plug parts together define a valve rotatable in the cylindrical chamber provided by the two coupling boxes when the same are placed together for connection. This chamber has an axis normal to the axes of the passageways in the coupling boxes so that when the plug is rotated to lock the boxes together it provides conduits connecting the corresponding passageways of the boxes. Means are provided on each box to retain half of the plug so that when the plug valve is rotated in the chamber to seal the passageways of the boxes, the boxes are simultaneously disconnected from each other.

It is, then, an object of this invention to provide a coupling having a valve for placing a plurality of passages in each coupling part in fluid flow relation while simultaneously locking each part together.

Another object of this invention is to provide a coupling having a split plug type valve defining a plurality of conduits between passages of the coupling parts.

Another object of the invention is to provide a multiple self sealing detachable coupling adapted to connect the ends of a plurality of pairs of conduits when coupled together and to seal the ends of each conduit when uncoupled.

A further object of the invention is to provide a multiple detachable coupling accommodating the coupling together of a plurality of pairs of different sized tubes, pipes, or hoses.

A further object of the invention is to provide a coupling device which automatically joins a plurality of pairs of passageways in unrestricted fluid flow communication when coupled together and which automatically seals the ends of the passageways of each pair when uncoupled.

Other and further objects of the invention will be apparent to those skilled in the art from the following detailed descriptions of the annexed sheets of drawings, which, by way of preferred example, disclose a specific embodiment of the invention.

On the drawings:

Figure 1 is a side elevational view of a multiple coupling mounted on the fire wall of an airplane engine nacelle and coupling together the ends of a plurality of tubes and hoses between an airplane engine and parts of the airplane body.

Figure 2 is a top plan view of the coupling shown in Figure 1.

Figure 3 is a top plan view similar to Figure 2 but illustrating the coupling parts in disconnected relation.

Figure 4 is a fragmentary isometric view of one-half portion of the split plug valve for the coupling.

Figure 5 is a fragmentary isometric view of the complementary split valve portion of the coupling for cooperating with the portion of Figure 4.

Figure 6 is an enlarged vertical cross-sectional view, taken along the line VI—VI of Figure 2.

Figure 7 is a horizontal cross-sectional view taken along the line VII—VII of Figure 6.

Figure 8 is an enlarged vertical cross-sectional view taken along the line VIII—VIII of Figure 3.

Figure 9 is a horizontal cross-sectional view taken along the line IX—IX of Figure 8.

As shown on the drawings:

In Figure 1 the reference numeral 10 designates generally a multiple detachable coupling according to this invention mounted on the fire wall 11 of an airplane engine nacelle (not shown). The coupling 10 includes coupling boxes 12 and 13. The coupling box 12 has a flange 14 extending outwardly from the sides thereof adapted to receive bolts such as 15 for fixedly securing the box to the fire wall 11. The fire wall 11 may be composed of an asbestos cover 11a backed by a more rigid wall 11b of metal, plywood or the like.

For the purpose of facilitating mounting of the coupling part 12 on the fire wall 11 a boss portion 12a of the part can extend rearwardly from the flange 14 thereof through a hole in the fire wall. The rest of the rear face of the coupling part can terminate flush with the flange portion 14 as best shown in Figures 6 to 8.

As best shown in Figures 6 and 8 the coupling box 12 has a plurality of transverse passages 16, 17, 18 and 19 therethrough. These passages are spaced apart from the top to the bottom of the box and, as illustrated, are of progressively decreasing diameters. Obviously, however, the passages could be of the same diameter if desired without departing from the principles of the invention.

Each passage 16 to 19 has an enlarged internally threaded outer end portion such as 20 for receiving in threaded relation therein thimble-type couplings such as 21 as shown in Figure 1 to retain the ends of pipes or tubes 22, 23, 24 and 25 therein.

The coupling box 13 has corresponding passages 16a, 17a, 18a and 19a therethrough with corresponding enlarged internally threaded outer end portions 20a for receiving thimble-type couplings 21a as shown in Figure 1 to retain the ends of flexible hoses 22a, 23a, 24a and 25a respectively in the passages.

As best shown in Figures 7 and 9 the coupling box 12 has side walls defining a segmental cylindrical chamber 26 normal to the passageways 16 to 19. The coupling box 13 is recessed as at 27 to define a segmental cylindrical chamber adapted to register with the chamber defined by the side walls of the box 12 so that when the boxes are placed in abutting relation a complete cylindrical chamber extends from the top to the bottom of the coupling which is normal to each passageway through the coupling boxes. The inner ends of these passageways receive packing rings such as 28 defining resilient ports for the passageways along the length of the cylindrical chamber.

As best shown in Figures 6 and 8 the chamber 26 of the coupling box 12 is stepped inwardly for each passageway of progressively diminishing diameter so as to provide shoulders 29, 30 and 31 in the recess. Each shoulder 29 to 31 is annularly grooved as at 32 for a purpose to be more fully hereinafter described.

The recess 27 of the coupling box 13 has similar shoulders 29a, 30a and 31a together with similar segmental annular grooves 32a.

The top of the coupling box 12 has a shoulder 33 with a segmental annular groove or well 34 therein. The bottom of the coupling box has a similar shoulder 35 and groove 36 but of smaller dimensions than the groove and shoulders 33 and 34.

Similar shoulders 33a and 35a and similar grooves 34a and 36a are formed on the top and bottom respectively of the coupling box 13.

A two-piece or split plug-type valve 40 is mounted in the cylindrical chamber defined by the mating coupling boxes 12 and 13. The valve 40 is composed of parts 41 and 42 each having stepped exterior cylindrical walls for bearing engagement with the stepped cylindrical walls of the coupling boxes. At each step of the valve part 41 there is provided a segmental circular rim 43 for riding in the grooves 32 of the coupling box. The valve part 42 has similar rims 43a for riding in the grooves 32a of the coupling box 13.

The top and bottom ends of the valve part 41 have segmental circular rims 44 and 45 respectively adapted to abut the shoulder-defining portions 33 and 35 respectively of the coupling box 12. Semi-circular caps 46 and 47 of U-shaped cross section are respectively disposed over the shoulders 33 and 35 and rims 44 and 45 of the coupling box 12 and the valve part 41 and have the legs thereof extending respectively into the grooves 34 and 36 and along the inner faces of the rims 44 and 45 to rotatably hold the ends of the valve parts 41 in the coupling box 12. The coupling box 13 has similar end caps 46a and 47a. The end caps 46, 47, 46a and 47a can be secured to the respective coupling boxes by means of screws such as 48 or by means of any other suitable securing means as shown in Figures 2 and 3.

As best shown in Figures 4 and 8 the valve part 41 has flat face portions 50 between semi-cylindrical wall portions 51 of progressively decreasing diameters. These walls 51 define, with the body of the valve part 41, cylindrical conduit sections 52, 53, 54 and 55 respectively for connecting the pairs of passages in the coupling boxes as will be hereinafter more fully explained.

As shown in Figures 5, 6 and 8 the valve part 42 has flat inner faces 50a separated by semi-cylindrical recessed portions 51a of progressively decreasing diameters. These recessed portions 51a are adapted to fit around the walls 51 of the valve part 41 so that the faces 50a of the valve part 42 can abut the faces 50 of the valve part 41 to produce a nested assembly of valve parts which turn as a single unit in the cylindrical chamber defined by the coupling boxes.

The upper walls of the valve parts 41 and 42 have upstanding lugs 52 and 52a respectively thereon projecting from the valve parts above the top of the coupling boxes. The upper ends of these lugs are slotted as at 53 to provide engaging means for a screwdriver or other tool for rotating the valve between open and closed position.

When the coupling has the boxes 12 and 13 thereof in coupled relation as shown in Figures 1, 2, 6 and 7, the conduit sections 52, 53, 54 and 55 of the valve 40 are in full communication with the respective pairs of passageways of the coupling boxes. Therefore the pipes and hoses shown in Figure 1 are in full communication. The valve 40, when rotated in the stepped cylindrical chamber provided by the coupling boxes so as to place its conduits in communication with the passageways of the coupling boxes, has the projecting rims 43, 44 and 45 of the valve part 41 partially moved into the grooves 32a, 34a and 36a of the coupling box 13. At the same time the rims 43a, 44a and 45a of the valve part 42 are partially moved into the grooves 32, 34 and 36 of the coupling box 12. This effects the locking together of the coupling boxes.

The conduit sections 52, 53, 54 and 55 of the valve are placed in full communication with the respective passages in the coupling boxes upon a quarter turn of the valve to the position shown in Figures 2, 6 and 7 from the position shown in Figures 3, 8 and 9.

When it is desired to uncouple the boxes, the valve is rotated one-quarter turn back from fully open position as shown in Figures 3, 8 and 9 to move the rims of each valve part out of the grooves of the other coupling box. The box sections are thus separable and each retain a valve part. At the same time however the outer cylindrical walls of the valve parts block the passages through the coupling boxes and snugly engage the resilient packing rings to seal off the inner ends of each passage in the coupling box.

The couplings of this invention thus accommodate a plurality of hoses, pipes or the like conduits to place pairs of the same in unrestricted fluid flow communication or in partially restricted fluid flow positions as well as sealed disengaged relation upon a mere rotation of a plug type valve. The plug type valve not only seals the ends of the conduits when the coupling boxes are disengaged but also forms intermediate conduit sections to join the conduits when the coupling boxes are connected. At the same time the valve locks the coupling boxes together in connected relation.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A multiple detachable coupling comprising a plurality of complementary coupling boxes each having a plurality of passages therein for fluid flow therethrough, a multi-piece valve rotatably mounted in said coupling boxes to detachably connect the same, said valve providing a plurality of passages adapted to connect passages in said complementary boxes, and means retaining a piece of said valve in each complementary box for sealing the passages in the boxes when the boxes are disconnected.

2. A multiple detachable coupling comprising a pair of complementary coupling boxes each having a plurality of passages therein for fluid flow therethrough, a multi-piece valve rotatably mounted in said coupling boxes to detachably connect the same, said valve having a plurality of passages therethrough each adapted to register with a pair of passages in said complementary boxes, and means retaining a piece of said valve in each complementary box for sealing the passages in the boxes when the boxes are disconnected.

3. A coupling comprising a pair of coupling boxes each having a plurality of passages therein, said boxes adapted to be positioned together and define a chamber in communication with said passages, a split plug valve rotatably mounted in said chamber and having a plurality of passageways adapted to connect passages of said boxes for placing said passages in fluid flow communication, wall portions on said split plug valve adapted to cover the passages of said boxes, and cooperating means on said plug valve and on said boxes for connecting the boxes in coupled relation whenever the valve is positioned to connect passages of the boxes and retaining a portion of the valve in each box whenever the valve is positioned to cover passages of the boxes.

4. A device for alternately connecting a plurality of pairs of conduit ends in fluid flow communication and for sealing each of said ends in disconnected relation which comprises a pair of coupling boxes together defining a plurality of fluid flow passageways therethrough and together defining an intersecting chamber between said passageways, a multi-piece plug rotatably mounted in said chamber and having a plurality of bores therethrough adapted to connect pairs of passageways of said boxes for placing the pairs of conduits in fluid flow communication, said plug having separable exterior walls adapted to seal the passageways in said coupling boxes in another position of the valve and means on said valve engageable with both of said coupling boxes for connecting the boxes together whenever the valve is turned to place the bores in fluid flow communication with said box passageways.

5. A coupling comprising a pair of complementary coupling boxes having a plurality of passageways therethrough and together defining a cylindrical chamber between said passageways in communication therewith, a multi-piece cylindrical plug rotatably mounted in said chamber and having a plurality of passages therethrough providing connecting conduit sections between the passageways of the boxes, solid exterior cylindrical walls on said plug adapted for sealing said passageways when the boxes are separated, cylindrical flanges on the ends of the plug, and retaining means carried by each coupling box receiving said flanges for retaining the plug parts in the boxes whereby a rotation of the plug will move the flanges of one plug part into engagement with the retaining means on the other coupling box for interlocking the coupling boxes.

6. A coupling comprising a pair of complementary coupling boxes each having a plurality of different sized passageways therein, said coupling boxes together defining a chamber normal to said passageways having cylindrical walls of progressively decreasing diameters, a two piece cylindrical plug valve having exterior cylindrical walls bearing on the cylindrical walls of said chamber, said valve having passageways defining conduits for joining the passageways of said coupling boxes and means on said valve and on said coupling boxes retaining the plug valve in the cylindrical chamber, said means adapted when the plug is in one position to hold the coupling boxes in connected relation and adapted when the plug is in another position to permit disengagement of the coupling boxes while the plug parts seal the passageways therein.

GEORGE H. HUFFERD.